United States Patent [19]

Levente et al.

[11] Patent Number: 4,987,541

[45] Date of Patent: Jan. 22, 1991

[54] METHOD FOR STORING RUN DATA OF A VEHICLE IN THE MEMORY OF AN ELECTRONIC TACHOGRAPH AND APPARATUS FOR CARRYING OUT THE METHOD

[76] Inventors: Székely Levente, Sisak u. 5., H-1209 Budapest; Rácz Gábor, Fillér u.1., H-1024 Budapest; Otta Károlyné, Népszinház u. 17., H-1081 Budapest, all of Hungary

[21] Appl. No.: 381,687

[22] PCT Filed: Dec. 29, 1987

[86] PCT No.: PCT/HU87/00061

§ 371 Date: Jun. 28, 1989

§ 102(e) Date: Jun. 28, 1989

[87] PCT Pub. No.: WO88/05196

PCT Pub. Date: Jul. 14, 1988

[30] Foreign Application Priority Data

Dec. 29, 1986 [HU] Hungary ........................ 5495/86

[51] Int. Cl.[5] .......................... G06F 13/00

[52] U.S. Cl. .................... 364/424.04; 364/424.03; 377/16; 377/26

[58] Field of Search .................. 364/424.03, 424.04; 340/438, 439; 377/16, 26; 360/5, 6

[56] References Cited

U.S. PATENT DOCUMENTS 4,533,962 8/1985 Decker et al. .................. 360/5
4,575,454 7/1988 Hisatake et al. .............. 364/424.03
4,638,289 1/1987 Zottnik ...................... 364/424.04
4,817,118 3/1989 Wilburn et al. ............... 364/424.04
4,853,859 8/1989 Morita et al. ................ 364/424.04
4,866,616 9/1989 Takeuchi et al. ............. 364/424.04

*Primary Examiner*—Gary Chin
*Attorney, Agent, or Firm*—Michael N. Meller

[57] ABSTRACT

A method for storing run data of a vehicle in a data memory of an electronic tachograph and displaying the run data with a predetermined resolution. The method includes the steps of sensing the movement of the vehicle, providing digital distance and velocity data from signals of the sensing step proportional to the travel distance of the vehicle and the instantaneous velocity, respectively, and reading the digital data into successive cells of the data memory of the tachograph in predetermined regular periods corresponding to a first sampling rate defining the resolution. The digital data are read into successive cells of an accident memory which has a substantially smaller storage capacity than the data memory at a rate substantially higher than the first sampling rate corresponding to regular intervals of distance traveled. Thereafter, the maximum and minimum values of the velocity and the value of the distance during each of the predetermined regular periods are determined. In the step of reading into the data memory, at least the minimum and maximum values of the velocity data and the distance value are stored. The contents of the accident memory are shifted forward at the rate corresponding to the regular intervals of distance traveled and the contents of the data memory are shifted at the first sampling rate.

7 Claims, 3 Drawing Sheets

Figure 1:
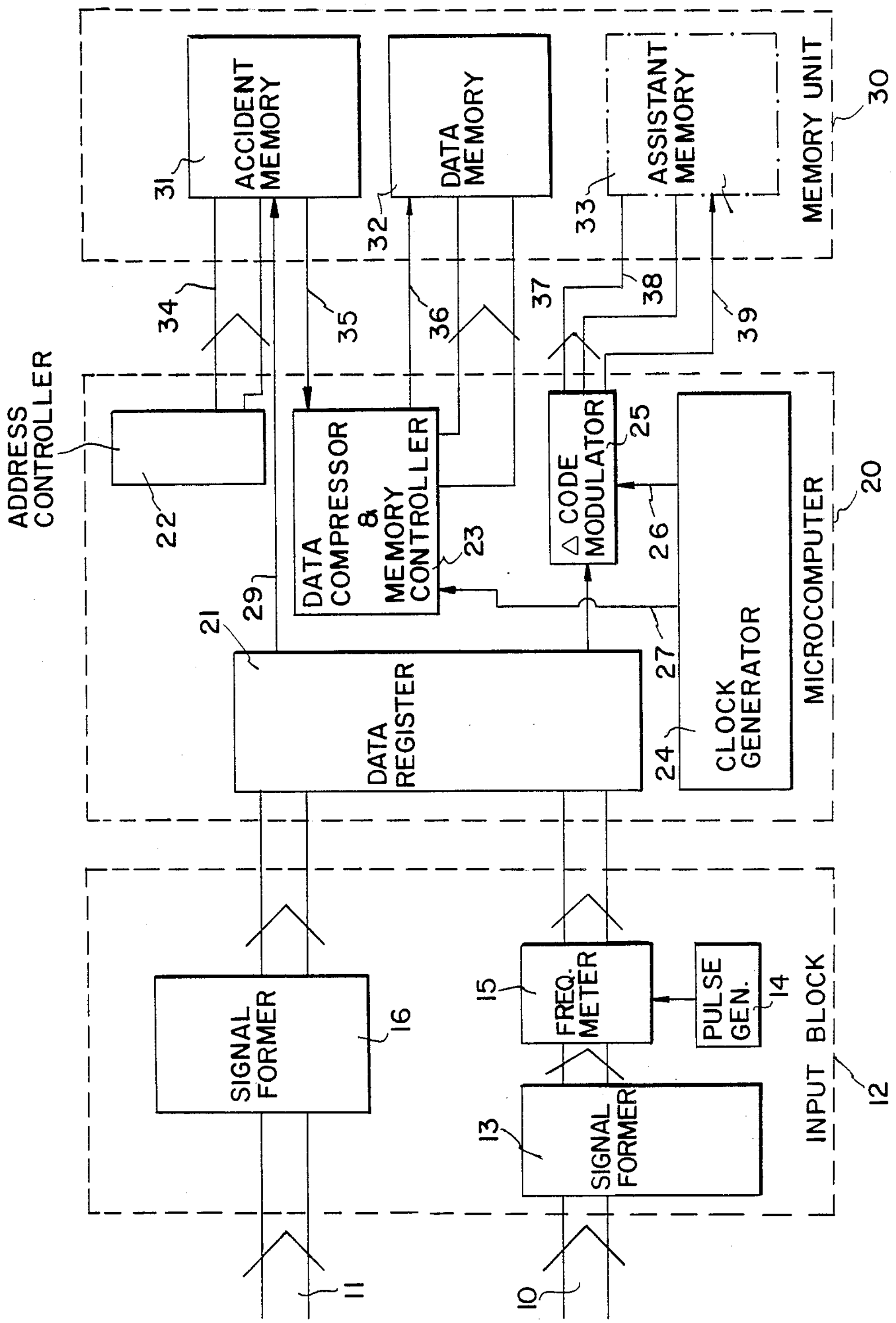

METHOD FOR STORING RUN DATA OF A VEHICLE IN THE MEMORY OF AN ELECTRONIC TACHOGRAPH AND APPARATUS FOR CARRYING OUT THE METHOD

The invention relates to a method for storing run data of a vechicle in the memory of an electronic tachograph and displaying these data with a predetermined resolution, in which the movement of the vehicle is sensed by means of a road sensor, digital ddistance and velocity data are provided from the sensed signals proportional to the advance of the vehicle and the momentary velocity, respectively and these digital data are read in subsequent cells of a data memory of the tachograph in predetermined regular periods.

The invention relates also to an apparatus for carrying out the method which comprises an input block with inputs coupled to pulse lines of a road sensor and to a static signal line, the input block comprising signal forming circuits, a pulse generator and a frequency meter with first input connected to the pulse generator and second input connected to the signal forming circuits associated with the pulse lines, a microcomputer connected to the output of the input block and a memory unit coupled to the microcomputer.

In our Hugarian patent published on Aug. 28, 1986 and having the application number 4841/84 entitled "electronic tachograph" the conditions for the reliable implementation of an electronic tachograph were discussed, including the protection of the memory against disturbances in the power supply and against any possible erroneous processor operation. The patent dealt also with the reading of the stored data by means of light emitting diodes and with the questions of identification. These aspects are important for the implementation of the tachograph function, but it has also a similarly high significance how the large amount of information should be stored to provide an optimum utilization of the memory. The sparing with the available memory capacity forms not only an economic question, but the amount of information that can be stored defines the length of operation of the tachograph without the risk of data losses and without the need for reading out the stored data. Nowadays the storage of data for one or two weeks of running time forms a general requirement.

Although a number of sampling and data compression methods are known, the analysis thereof has shown that most of them are connected with problems when applied for the realization of a tachograph function.

In a known way of compressed data storage only changes in the sensed variable are recorded together with the associated time data. This method enables a compressed data recording if the sensed process is sufficiently slow. In vehicles, however, this condition cannot be met because the speed of the vehicle can vary within wide limits . Therefore such a method cannot be used. The generally accepted sampling technique should take into account the frequent changes in the velocity. Therefore the true reproduction of the velocity-time curve would require a very frequent sampling and the storage of the sampled data. The storage of such an amount of information would be rather redundant.

In the case of using a delta code modulation each sampling would be associated with 1 of information only, which means a decreased amount of information to be stored. From these information the changes in the vehicle speed can be reconstructed. The problem lies here also in the required high number of sampling points, since the speed of the vehicle can be changed in 10 to 20 seconds even up to 60 km/hr. Therefore the signal reproduction would require a sampling in every 1 or 2 seconds. In view of the full operational period of about two weeks such a sampling would still require a considerably high storage capacity.

In addition to the appropriate data storage a further problem is connected with the reading out of this information. In a number of conventional data recording equipment the data carrier which stores the information (casette or memory) is removed and transported to a central location for reading out the stored information. If the data carrier is damaged during the transport, the important information can be lost. A further problem arises from the possibility that the single data carrier can be altered if they can be accessed by unauthorized persons.

A further requirement can be imposed on an apparatus which aims at implementing the tachograph function electronically, and this lies in the exact reconstruction of the run data just preceding an accident. The term 'exact' intends to cover the reconstruction of the velocity-time curve with an accuracy being one or two orders of magnitude higher than the accuracy of data readable from the tachograph chart.

The object of the invention is to provide a method and an apparatus for carrying out the same, which can record information which is at least equivalent with the one stored in conventional tachographs using paper disc but which has an economic utilization of the available memory and which is capable of implementing at least certain ones of the aforementioned additional requirements.

The invention is based on the recognition that the thickness of the lines in the charts of tachographs using paper discs limit the resolution in time to about one half minute. Therefore it is sufficient to store data at such a rate, but in each half minute period it is important to know the extreme values of the velocity.

According to the invention data representing the velocity and distance taken by the vehicle are read in subsequent cells of an accident memory which has a substantially smaller storage capacity than a data memory storing the run data at a first rate substantially higher than a sampling rate associated with the prescribed accuracy, and the maximum and minimum values of the vellocity and the value of said distance are determined during periods following each other at the sampling rate, and at least said minimum and maximum values of the velocity data and the distance value are entered in the data memory in each sampling period, and the content of the accident memory is shifted forward at said first rate and the content of the data memory is shifted forward at said sampling rate.

In a preferable embodiment the reading into the accident memory occurs when a predetermined distance, e.g. 2 meters, has been traveled by the vehicle, and as many data are stored in the accident memory as required for the reconstruction of an accident, e.g. which correspond to a distance of about 500 meters.

A substantial increase can be attained in the resolution if the extreme values of the velocity are stored in the data memory in the order as they actually follow each other in the associated period.

The resolution can further be increased by using an additional delta code modulation.

In a further preferable embodiment for the retrieval of the stored data at a central location the content of the memories but at least that of the data memory is copied in a data storage means in such a way that the content of the memories remains unchanged during the copying operation. The apparatus for carrying out the method can be characterized in that the memory unit thereof comprises an accident memory with address lines and data bus coupled to a memory address controller associated with a microcomputer, and a data memory with data bus and address bus coupled to a data compressor and memory controller belonging to the microcomputer. The microcomputer comprises a clock generator and an input data register.

In a preferable embodiment the memory unit comprises an assistant memory with data bus and address bus coupled to a delta code modulator which is implemented in the microcomputer.

The high sampling rate in the accident memory enables the determination of the extreme values of the velocity in the correct order during the half minute intervals, which facilitates effective and dense data storage and the reconstruction of any accident.

Figure 2:
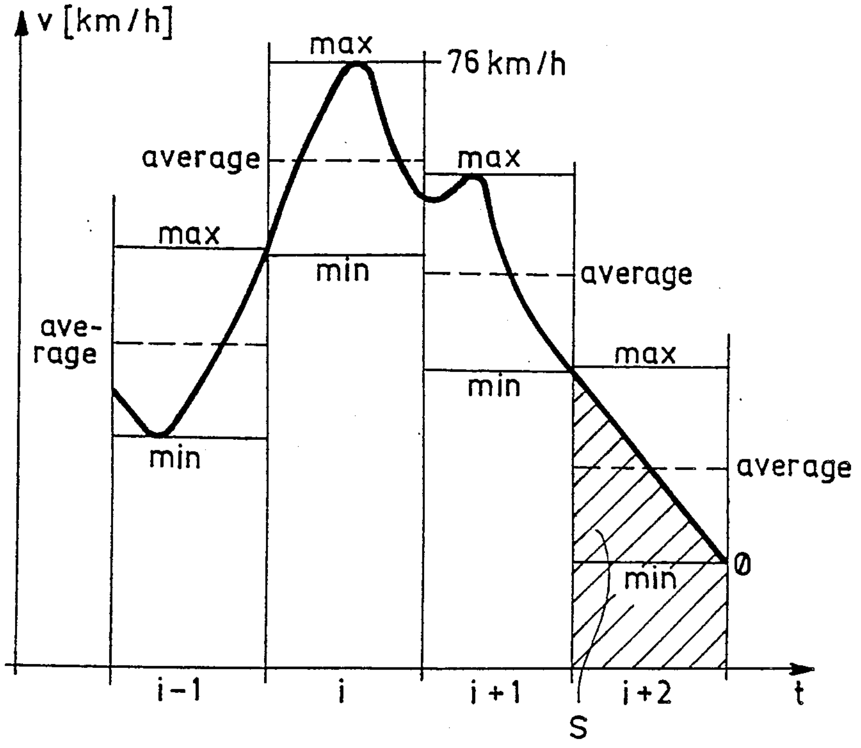
Figure 3:
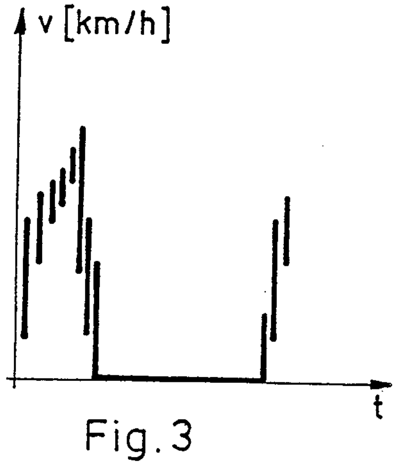
Figure 4:
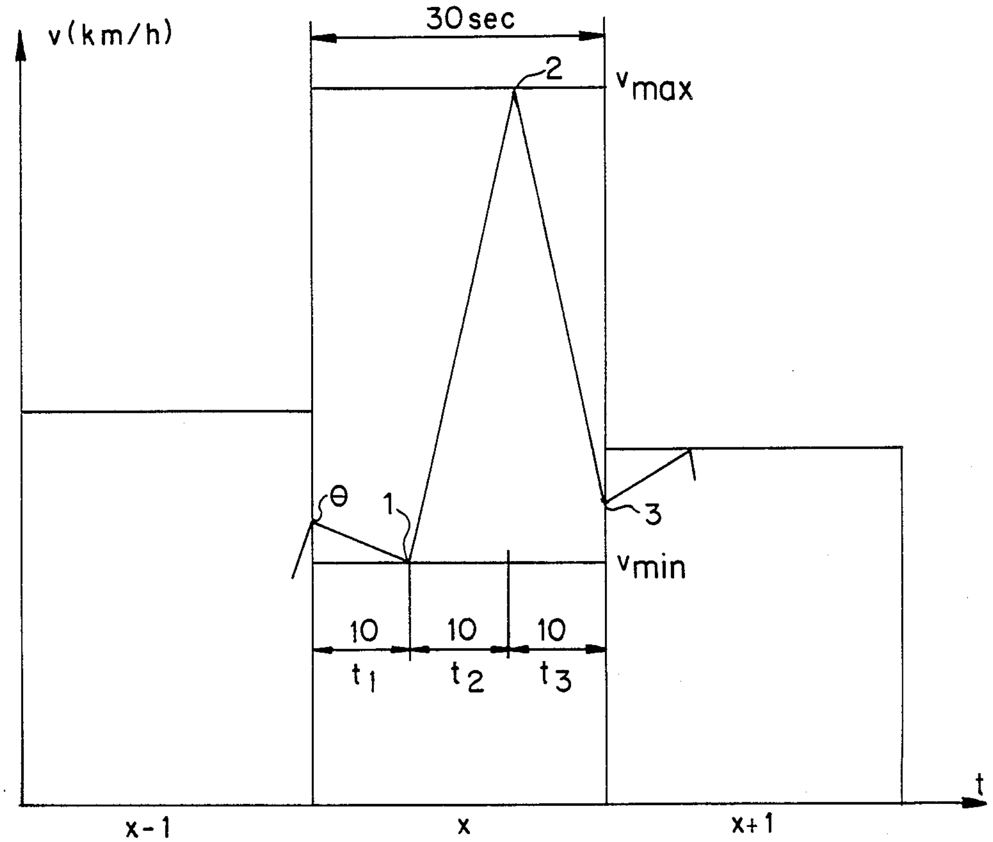
Figure 5A:
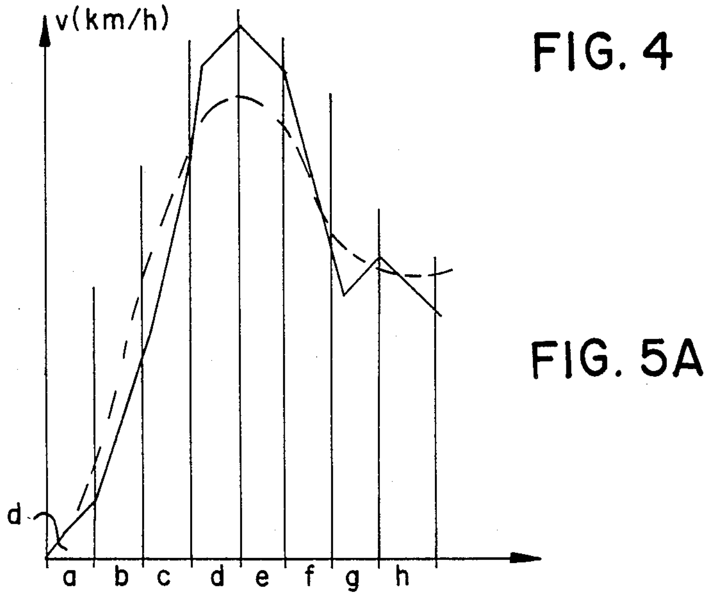
Figure 5B:
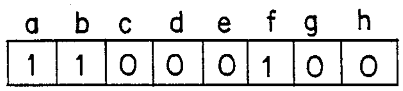

The invention will now be described in connection with preferable embodiments thereof, in which reference will be made to the accompanying drawings. In the drawing:

FIG. 1 shows the functional block diagram of the apparatus according to the invention, FIG. 2 is a velocity-time curve with enlarged time scale, FIG. 3 is a diagram corresponding to FIG. 2 with a compressed time scale, FIG. 4 is a diagram illustrating the generation of a higher resolution, and FIGS. 5A and 5B are diagrams illustrating the delta code modulation.

FIG. 1 shows the functional block diagram of the apparatus according to the invention which comprises three main parts such as input block 12, microcomputer 20 and memory unit 30. Input block 12 receives through pulse line 10 pulses generated by a road sensor in response to actual movement of the vehicle in which the apparatus is arranged and further pulses generated by a fuel consumption sensor. In addition to these pulse signals certain status data are also required for the correct run recording (such data are e.g. the position of the ignition key, the on- or off-state of the brake lamps and in certain cases identification data of the driver). The input block 12 receives these status data through static signal lines 11. Pulse lines 10 are coupled through signal forming circuits 13 to gate inputs of frequency meters 15. Frequency meters 15 have pulse inputs receiving constant frequency meters 15. Frequency meters 15 have pulse inputs receiving constant frequency output pulses from pulse generator 14 The frequency meters 15 pass the clock pulses of the pulse generator 14 to their outputs during the time periods defined between consecutive pulses appearing at their respective gating inputs. Therefore the number of pulses at the output of the frequency meters corresponds to the time elapsed between respective gating pulses. The number of pulse-sensing channels is equal to the number of quantities which should be measured, e.g. in the exemplary embodiment one channel is associated with the measurement of the distance traveled by the vehicle (and with the velocity determined from the distance), while another channel is used for measuring the fuel consumption. The static signal lines 11 are coupled to inputs of further signal forming circuits 16.

The microcomputer 20 can be implemented by a general purpose microprocessor and FIG. 1 shows only those of its functional blocks which are required for understanding the operation. Data register 21 is used to receive output signals of the input block 21. The microcomputer 20 comprises a clock generator 24 which delivers output pulses e.g. in 30 second intervals, an accident memory address controller 22, a data compressor and memory controller 23 and a delta code modulator 25.

The memory unit 30 consists of three parts, i.e. accident memory 31, data memory 32 and assistant memory 33. This last memory is required only if higher accuracy requirements are imposed on the data storage.

Address lines 34 of the accident memory 31 are connected to the output of the memory address controller 22 and data lines of the accident memory 31 are coupled to the data bus of the microcomputer 20. Predetermined outputs of the data register 21 are connected through line 29 to data lines of the accident memory 31 and a further output 28 thereof is connected to the input of the delta code modulator 25. The output of the clock generator 24 is coupled through line 26 to the delta code modulator 25 and through line 27 to the data compressor and memory controller 23.

Data lines of the accident memory 31 are coupled through bus 35 to the input of the data compressor and memory controller 23 and the output of the latter is coupled to data bus 36 and address bus 37 of the data memory 32. Data bus 38 and address bus 39 of the assistant memory 33 are coupled to the delta code modulator 25.

The operation of the apparatus according to the invention will be explained in connection with the time diagrams of FIGS. 2 to 5.

The most general task lies in the implementation of the function of a tachograph. This requires a data storage which comprises a sufficient amount of information on the basis of which a tachograph chart can be plotted. The line thickness of recorders used generally in tachographs renders the distinction of events longer than 30 seconds possible, i.e. the resolution in time is not better than 30 seconds. In accordance therewith the clock generator 24 delivers clock pulses in 30 second intervals.

When the vehicle moves, the road sensor generates respective gating pulses after every 2 meters of movement. The data register 21 will store the number of pulses of the pulse generator 14 occurring in the time required for the completion of the distance of 2 meters. The microcomputer 20 calculates the velocity of the vehicle for each road sections of 2 meters and writes these velocity data in successive cells of the accident memory 31 having consecutive addresses. Seven bits are generally sufficient for the storage of the velocity data, whereby the velocity range of 0 to 128 km/hour can be recorded with an accuracy of 1 km/h. The accident memory 31 comprises 256 cells and it stores the data associated with the last 512 meters of the route with a high accuracy. When all cells of the accident memory 31 have been filled, the accident memory address controller 22 directs the next new data to be written in the first cell and it shifts the content of the memory 31 forward by one cell. The oldest data comprised in the last cell of the memory will then be lost. A data storage with such a high resolution is not necessary for the long term run recording, and for the reconstruction of an accident the retrieval of the data associated with the last few hundred meters is sufficient and the capacity of the accident memory 31 has been chosen accordingly.

for the long term storage of the run data the efficient utilization of the available capacity of the data memory 32 and the necessary run reconstruction require an optimum amount of data compression. In each 30 second period the microcomputer 20 knows The velocity data determined in 2-meter road sections. From this information the data compressor and memory controller 23 determines for each period the maximum and minimum speed and the distance traveled by the vehicle and it writes these data into the cell at the always actual first avialable address of the data memory 32, then shifts further the whole content of the memory by one step. It can be appreciated that based on the data stored in the accident memory 31, the microcomputer 20 knows the order of the maximum and minimum speed in every 30 second period.

In FIG. 2 the actual values of the velocity have been plotted for the periods $i-1$, i, $i+1$ and $i+2$, as well as the minimum and maximum and average values of the velocity which can be calculated from the distance data. In the period $i+2$ the hatched area below the curve corresponds to the distance taken in the period, and this distance is known. If in the respective periods only the two extreme velocity values are stored, then the velocity run chart will have a linear form as shown in FIG. 3 which can be plotted as a round chart by means of an appropriate chart plotter. The line thickness corresponds to half minutes, thus the resolution corresponds to those of conventional tachographs.

It is preferable if in each half minute period 4 bytes of information is stored. In a preferable embodiment a four-byte cell of the data memory 32 looks as follows:

| | | | | | | | |
|---|---|---|---|---|---|---|---|
| F | M | M | M | M | M | M | M |
| F | m | m | m | m | m | m | m |
| K | $G_1$ | $G_2$ | $G_3$ | s | s | s | s |
| s | s | s | s | s | s | s | s |

In the table F designates the number of pulses of the fuel consumption meter in deciliter units, i.e. the maximum measurable fuel consumption is 8 dl/min, M designates the maximum velocity in km/hour units, in which the available 7 bits allow the recording of at most 128 km/h, m designates the minimum velocity values, also in 7 bits, K designates the state of the ignition key, bits $G_1$ to $G_3$ are freely definable constants, and s designates the distance in meters.

If the maximum value of 128 km/h is not sufficient, then the data can be recorded in 2 km/h units instead of 1 km/h units, whereby a velocity range of 0 to 256 km/h will be storable, however, the resolution will be half as high. The widening of the range at the expense of the resolution (accuracy) can be increased by similar methods also in the case of known paper disc tachograph systems.

The correct time data can be recorded in a separate memory cell. e.g. once a week, whereafter the number of each cell will be equal to the number of the half-minute steps.

In a preferable embodiment of the invention three times higher resolution can be obtained without increasing the number of data to be stored. This can be accomplished if the extreme velocity values in the first two bytes are not written in a predetermined order (i.e. that the first byte comprise the maximum, while the second one the minimum values), but the order thereof should correspond to their actual order in the associated period. If in a particular period the minimum occurred first, then this should be stored in the first byte and thereafter the maximum and vice versa. In the possession of the detailed data in each period such a storage can be carried out without any difficulties.

If the extreme speed values are stored in a correct order, then more accurate run information can be obtained from these data if further information characteristic of certain properties of the vehicle (such as maximum acceleration and deceleration) are also taken into account (of course, by means of the microcomputer). This method will be illustrated in FIG. 4.

The beginning of an interval in the x-th period that corresponds to the maximum or minimum speed overlaps with the end of the previous $(x-1)$-th period in a predetermined range. As a first step of iteration it will be supposed that the curve that defines the actual variation of the speed falls in the middle of this overlapping range, then the x-th period will be divided in three equal parts which are all 10 seconds long. The first part will be associated with the first extreme value (which is the minimum in the exemplary case) and the second part will be associated with the other extremity (being the maximum in the example of FIG. 4) and the curve will be terminated at the middle of the overlap section between the x-th and $(x+1)$-th period.

This kind of approximation might have two limitations. The first on lies in that the area defined below the so-obtained curve is not equal to the actual distance taken during this period, while the other one lies in that the changes in speed are higher than allowed by the maximum acceleration or deceleration. In the latter case the location of the points 1 and 2 will be changed along the time axis until the limitations concerning the maximum acceleration and deceleration values are fulfilled. The area below the curve can be changed by shifting the point 3 along the vertical (speed) axis. If such changes still prove to be insufficient, then horizontal sections will be inserted at the minimum or maximum values depending on whether the calculated distance is smaller or higher than the actually measured distance value. Practical experiences have shown that already after 3 or 4 steps of iteration a curve was obtained which was very close to the actual one. The time scale of the chart should be changed according to the three-times higher accuracy, because if a full circle chart corresponds to e.g. one day, then the mechanical thickness of the lines of the recorder does not allow such a high resolution. The correct time scale in that case is 8 hours/full circle.

If still higher resolution is required, then the resolution in time can be increased to 4 seconds by means of delta code modulation at the expense of storing one more byte every half minute, which results in an increase of 25% in memory storage capacity. This embodiment requires the use of the optional units shown in FIG. 1, i.e. the delta code modulator 25 and the assistant memory 33.

The essence of this method lies in that the analogue velocity-time curve will be approximated by linear sections characterized by a predetermined acceleration or deceleration. If at the end moment of such a section the actual speed is higher than the approximated speed, then a bit with value 1 is stored, while if it is lower, then a bit 0 is stored. FIGS. 5A and 5B shows an example for a predictive delta code modulation, in which the above principle is modified by the fact that if in several consecutive sections identical bit values are found, then the steepness of the approximating linear curve is increased (doubled) or decreased (halved).

In FIG. 3A the linear approximating function of eight intervals of a 30-second-long period was plotted by a solid line and the actual curve was shown by a dashed line. The content of the memory cell corresponding to the intervals a,b,c,d,e,f,g and h can be seen in the associated intervals depicted in FIG. 5B. Following the interval a the actual curve is still above the approximating function; therefore the approximation continues with a double steepness. At the end of the interval c the condition changes, which persists until the end of the interval f; therefore the approximation is gradually decreased, whereafter it is increased and decreased.

In spite of the fact that the delta code modulation can express the changes only within a predetermined error range, the approximation will be very accurate, since the data memory 32 will continue storing the extreme speed values and the distance value. Thus these values can also be taken into account at the iteration. On the basis of FIG. 5, however, the operation of the delta code modulator has become clear. The evaluation of the stored data takes place in central data processing locations by means of appropriate data processing equipment. The present invention is directed therefore primarily to the delivery and storage of data which can be reconstructed with sufficient accuracy.

A further characteristic feature of the apparatus according to the invention lies in the way how the stored data can be transferred to data processing center. The fact that the whole content of the memory unit 30 will be shifted forward by one step in each sampling cycle results in the continuous refreshment of the stored information which can correspond e.g. to the data collected in the last two weeks. When the memory is read out its content need not and should not be cleared, and this readout step is carried out by copying the content of the memory unit 30 into an appropriate outer memory coupled to the apparatus. This copy operation can be performed by connecting the data and address lines of the outer memory to corresponding data and address buses of the microcomputer 20, and reading the data in the outer memory.

This way of information collection enables the safe storage of run data in the original memory unit which will not be lost by the reading out of the information. The data can be checked even after their readout and the information retrieval does not interfere with the internal operation of the apparatus which makes any tampering with the data impossible.

We claim:

1. A method for storing run data of a vehicle in a data memory of an electronic tachograph and displaying said run data with a predetermined resolution, comprising the steps of sensing the movement of the vehicle, providing digital distance and velocity data from signals of the sensing step proportional to the travel distance of the vehicle and the instantaneous velocity, respectively, reading said digital data into successive cells of said data memory (32) of the tachograph in predetermined regular periods corresponding to a first sampling rate defining said resolution, wherein said digital data are read into successive cells of an accident memory (31) which has a substantially smaller storage capacity than said data memory (32) at a rate substantially higher than said first sampling rate corresponding to regular intervals of distance traveled, determining the maximum and minimum values of the velocity and the value of said distance during each of said predetermined regular periods, and in said step of reading into the data memory (32) at least said minimum and maximum values of the velocity data and the distance value are stored, shifting forward the contents of the accident memory (31) at said rate corresponding to said regular intervals of distance traveled and shifting forward the content of the data memory (32) at said first sampling rate.

2. The method as claimed in claim 1, wherein the reading into said accident memory (31) occurs when a predetermined distance has been traveled by the vehicle, to ensure sufficient amount of said digital data being stored in the accident memory (31) to reconstruct the vehicle velocity immediately prior to an accident.

3. The method as claimed in claim 1, wherein said minimum and maximum values of the velocity are stored in the data memory (32) in the same order in which they occurred in real time.

4. The method as claimed in claim 1, wherein each of said periods is divided into a predetermined number of intervals and further comprising the step of approximating the velocity in each said period by the linear functions according to a delta modulation and storing a respective bit value in each interval in dependence on whether the approximated velocity is higher or lower than the actual velocity, and reading said respective bit value in each of said periods in a cell of an assistant memory (33) associated with the cell of the data memory (32) storing the data corresponding to said periods.

5. The method as claimed in claim 1, further comprising the step of storing in each of said periods an information of four bytes with eight bits in each of said bytes in the data memory (32), a few of said 32 bits being associated with a sampled digital value of a fuel consumption of the vehicle during the associated period and with predetermined other condition data of the vehicle.

6. An apparatus for storing travel data of a vehicle in the a memory of an electronic tachograph and displaying said travel data with a predetermined resolution, comprising an input block (12) having inputs coupled to pulse lines (10) of a road sensor (11), the input block (12) comprising signal forming circuits (13, 16), a pulse generator (14) and a frequency meter (15) with a first input connected to the pulse generator (14) and a second input connected to the signal forming circuits (13) associated with the pulse lines (10), a microcomputer (20) connected to the output of the input block (12) and a memory unit (30) coupled to the microcomputer (20), wherein the memory unit (30) comprises an accident memory (31) with address lines (34) and a data bus (35) coupled to a memory address controller (22) associated with the microcomputer (20), a data memory (32) with a data bus (36) and an address bus (37) coupled to a data compressor and memory controller (23) within the microcomputer (20) and the microcomputer (20) comprises a clock generator (24) and an input data register (21) said accident memory receiving from said input data register and storing information comprising a predetermined number of the most recent samples of instantaneous travel data output by said frequency meter in response to signals from said pulse generator based on measurements made by said road sensor, said instantaneous samples being taken at regular intervals of distance traveled corresponding to a first sampling rate and being stored at addresses determined by said address controller; and said data memory receiving from said data compressor and memory controller and storing information comprising samples of processed travel data formed by compressing said instantaneous travel data, said processed samples being taken at regular intervals of time determined by said clock generator corresponding to a rate substantially lower than said first sampling rate.

7. The apparatus as claimed in claim 6, wherein the memory unit (30) further comprises an assistant memory (33) with a data bus (38) and an address bus (39) coupled to a delta code modulator (25) incorporated in the microcomputer (20).

* * * * *

UNITED STATES PATENT AND TRADEMARK OFFICE
CERTIFICATE OF CORRECTION

PATENT NO. : 4,987,541

DATED : January 22, 1991

INVENTOR(S) : LEVENTE, ET AL.

It is certified that error appears in the above-identified patent and that said Letters Patent is hereby corrected as shown below:

On the title page, under item [19]:

Second line, amend "Levente et al." to read

--Székely et al.--

On the title page, left column, amend item [76] to read as follows:

--[76] Inventors: Levente Székely, Sisak u. 5., H-1209 Budapest; Gábor Rácz, Fillér u.1., H-1024 Budapest; Károlyné Otta, Népszinház u. 17., H-1081 Budapest, all of Hungary--

Signed and Sealed this

Eighth Day of September, 1992

*Attest:*

DOUGLAS B. COMER

*Attesting Officer*

*Acting Commissioner of Patents and Trademarks*